United States Patent [19]

Chung

[11] 4,313,794
[45] Feb. 2, 1982

[54] SELF-ACTUATING AND LOCKING CONTROL FOR NUCLEAR REACTOR

[75] Inventor: Dong K. Chung, Chatsworth, Calif.

[73] Assignee: Rockwell International Corporation, El Segundo, Calif.

[21] Appl. No.: 12,275

[22] Filed: Feb. 15, 1979

[51] Int. Cl.³ .............................................. G21C 7/06
[52] U.S. Cl. .................................. 376/352; 137/457; 251/65; 376/210; 376/336
[58] Field of Search .................. 176/22, 86 R, 35; 137/457, 516.11, 533.17; 251/343–344, 76, 65

[56] References Cited

U.S. PATENT DOCUMENTS

| | | | |
|---|---|---|---|
| 2,299,155 | 10/1942 | Lange | 251/65 |
| 2,303,702 | 12/1942 | Mantz | 251/65 |
| 3,093,155 | 6/1963 | Dawes | 137/516.11 |
| 3,147,188 | 9/1964 | Campbell | 176/86 R |
| 3,228,847 | 1/1966 | Parkinson | 176/35 |
| 3,257,286 | 6/1966 | Ryon | 176/35 |
| 3,347,747 | 10/1967 | West | 176/35 |
| 3,805,826 | 4/1974 | Westerhoff | 137/533.17 |
| 4,076,583 | 2/1978 | Ash | 176/35 |

*Primary Examiner*—Samuel W. Engle
*Assistant Examiner*—Edward F. Miles
*Attorney, Agent, or Firm*—Clark E. De Larvin; Henry Kolin

[57] ABSTRACT

A self-actuating, self-locking flow cutoff valve particularly suited for use in a nuclear reactor of the type which utilizes a plurality of fluid support neutron absorber elements to provide for the safe shutdown of the reactor. The valve comprises a substantially vertical elongated housing and an aperture plate located in the housing for the flow of fluid therethrough, a substantially vertical elongated nozzle member located in the housing and affixed to the housing with an opening in the bottom for receiving fluid and apertures adjacent a top end for discharging fluid. The nozzle further includes two sealing means, one located above and the other below the apertures. Also located in the housing and having walls surrounding the nozzle is a flow cutoff sleeve having a fluid opening adjacent an upper end of the sleeve, the sleeve being moveable between an upper open position wherein the nozzle apertures are substantially unobstructed and a closed position wherein the sleeve and nozzle sealing surfaces are mated such that the flow of fluid through the apertures is obstructed. It is a particular feature of the present invention that the valve further includes a means for utilizing any increase in fluid pressure to maintain the cutoff sleeve in a closed position. It is another feature of the invention that there is provided a means for automatically closing the valve whenever the flow of fluid drops below a predetermined level.

10 Claims, 2 Drawing Figures

SELF-ACTUATING AND LOCKING CONTROL FOR NUCLEAR REACTOR

The Government has rights in this invention pursuant to Contract No. EY-76-C-03-0824 awarded by the U.S. Department of Energy.

BACKGROUND OF THE INVENTION

1. Field of the Invention

Broadly, the present invention relates to a self-actuating and self-locking flow cutoff valve. It particularly relates to use of such a valve in a nuclear reactor of the type which utilizes a plurality of fluid supported absorber elements to provide for the safe shutdown of the reactor.

2. Prior Art

There are numerous applications wherein there is a need for a self-actuating, self-locking flow cutoff valve. The need is particularly great in the case of nuclear reactors of the type which utilize a plurality of fluid supported neutron absorber elements to ensure the capability for a safe shutdown of the reactor. More particularly, heretofore nuclear reactors were typically shut down by control rods which were introduced through the top of the core and raised from or lowered into the core by mechanical means such as a motor which operates via clutch gears or the like. In an emergency, the clutch would be disengaged and the control rods allowed to fall into the core to shut down the reactor. Such a system had certain disadvantages. Specifically, there is a possibility that a mechanical device such as the clutch could not be disengaged or that some fault may have occurred which would distort the passage through which the control rods have to pass causing them to bind and preventing full insertion of the rods into the core. In such instance, it would not be possible to shut down the reactor. Accordingly, considerable interest has been generated in the use of a plurality of fluid supported neutron absorbing elements which would fall under the influence of gravity into the core in the event of a loss of fluid flow. Thus the reactor could be shut down by the simple expedient of shutting off the flow and further, in the event of an unforeseen loss of fluid flow, the reactor also would be shut down automatically.

U.S. Pat. No. 3,228,847 suggests a reactor control system which includes a control assembly for controlling neutronic flux. The control assembly comprises an inner tube extending from a nonactive region of the reactor into the active region, and an outer tube surrounding the inner tube and spaced therefrom. The outer tube has a closed end and the inner tube has an open end adjacent and spaced from the closed end of the outer tube. Neutron absorbing particles are positioned between the inner and outer tube for movement along the tube under the force of flow. The neutron absorbing particles are moved out of the active region of the reactor by fluid flow and fall back into the active region under the influence of gravity when the flow is shut off.

U.S. Pat. No. 3,257,286 suggests a ball-type control for a nuclear reactor. A number of elongated conduits are positioned in the nuclear reactor so that the first section of the conduit is located within the core and an adjoining second section is located exteriorly of the core. Each conduit holds a number of individual bodies, each of which contains a high neutron absorption cross-section material. The movement of the neutron absorber bodies within the conduits is achieved by providing a source of pressurized fluid available to each end of the conduit for selectively positioning the neutron absorber bodies within the first and second sections of the conduit. It is stated that a fission reactor can be started up, shut down, or reactivity controlled during reactor operations by varying the location of the absorber bodies.

U.S. Pat. No. 3,347,747 discloses a control organization and method for a nuclear reactor. The reactor is provided with a number of laterally spaced vertical passageways in the region of the core and distributed throughout the area thereof. The passageways include a lower portion which extends generally throughout the height of the core and an upper portion which extends above the core into the reactor vessel. Positioned within and confined in each passageway is a movable means which contains a poison and which is movable from a lower position within the region of the core to an upper position in the passageway, where it is generally above the core. The poison-containing means is moved by gravity to its lower position and is moved from its lower to its upper position by means of a fluid which is directed upward in the passageway.

In U.S. Pat. No. 4,076,583 there is disclosed another control method for a nuclear reactor which comprises a plurality of elongated conduits extending through and above the core of a reactor. A plurality of neutron absorber elements are located within the conduit, and during normal operation form a stacked bed in the portion of the conduit extending above the core. That section of the conduit in which the stacked bed is formed is provided with a fluid bypass means, it having been found that such bypass means ensures the capability of reliably maintaining all of the absorber elements in the stacked bed and out of the core during normal operations and further minimizing the pressure drop of fluid flowing through the stacked bed during normal operation.

While all of the foregoing suggested techniques appear to offer advantages over reliance solely on a control rod system, there is still room for improvement. More particularly, in all of these systems where gravity is relied upon to cause the absorber elements to move into the core, any residual fluid flow, even though it may be below the minimum for safe operation of the reactor, acts to retard the fall of the absorber elements. For example, in the event of a complete power failure, the inertia of a centrifugal pump would be sufficient to continue providing some flow after the loss of power and after the flow rate of fluid had dropped below the point at which the reactor should be shut down. Thus, clearly it would be advantageous to have a self-actuating flow cutoff valve in the fluid stream such that once the fluid flow dropped below a predetermined point, the valve would automatically close and substantially reduce the time required for the neutron absorbing elements to fall into the reactor core and safely shut it down. Further, in the event that there might be some erratic flow or surge of pressure or flow subsequent to it having declined below the safe level, such valve advantageously would be self-locking to prevent an inadvertent startup of the reactor by a resumption of fluid flow.

SUMMARY OF THE INVENTION

The present invention provides a flow cutoff valve which is self-actuating and once in a closed position is self-locking. The present invention is particularly applicable to a nuclear reactor of the type which utilizes a plurality of fluid supported absorber elements to provide for the safe shutdown of the reactor. Broadly, the invention comprises a substantially vertical elongated housing having an apertured plate located therein, the apertures providing for fluid flow from one end of the housing to the other. A substantially vertical elongated nozzle member also is located in and affixed to the housing. The nozzle member has an opening in its bottom end for receiving fluid and apertures adjacent the top end for discharging fluid, and two sealing means comprising radially outwardly and downwardly extending sealing surfaces, one located above and the other below the apertures. The nozzle member is surrounded by the walls of an elongated flow cutoff sleeve having a fluid opening adjacent its upper end. The sleeve also includes two sealing means comprising radially inwardly and upwardly extending sealing surfaces affixed to it, one below the flow opening and one adjacent the lower end of the sleeve. The sleeve is movable from an upper open position wherein the nozzle apertures are substantially unobstructed to the flow of fluid therethrough and a closed position wherein the sleeve and nozzle sealing surfaces are mated and the mated sealing surfaces and the walls of the sleeve obstruct the flow of fluid through the apertures. In addition, the nozzle and sleeve sealing means cooperatively act together to provide for the exposure of a greater area for fluid pressure to exert a force in a downward direction than is exposed to fluid pressure to exert a force in an upward direction whereby once said valve is in a closed position, any increase in fluid pressure will act to maintain the valve in a closed position. The valve further includes a balance member located above and attached to the flow cutoff sleeve. The balance member contacts the apertured plate when the sleeve is in an open position and obstructs the flow of fluid through a predetermined flow area of the apertures in the apertured plate to produce a pressure drop across the apertured plate and balance member; the pressure drop being just sufficient to support the balance member and flow cutoff sleeve at a predetermined minimum fluid flow. Thus, when the fluid flow drops below a predetermined value, the pressure drop across the balance member will be insufficient to maintain the flow cutoff sleeve in an open position and it will move under the influence of gravity to a closed position.

In one embodiment of the invention, the cutoff valve further includes a piston member extending upwardly from the top end of the nozzle member and into the flow cutoff sleeve a sufficient distance such that when the sleeve moves from an open to a closed position, the uppermost portion of the piston member moves past the flow opening in the flow cutoff sleeve and the fluid trapped therein provides a dampening force on the closure of the flow cutoff sleeve to prevent or minimize any hydraulic shock. In yet another embodiment of the invention, the valve further includes a mechanical means for moving the flow cutoff sleeve between an open and closed position.

The various features of the novelty which characterize the invention are pointed out with particularity in the claims which form part of this specification. For a better understanding of the invention, its operating advantage and specific objects attained by its use, reference should be made to the accompanying drawings and descriptive matter in which are illustrated and described, respectively, certain preferred embodiments of the invention.

DESCRIPTION OF A PREFERRED EMBODIMENT

Figure 1:
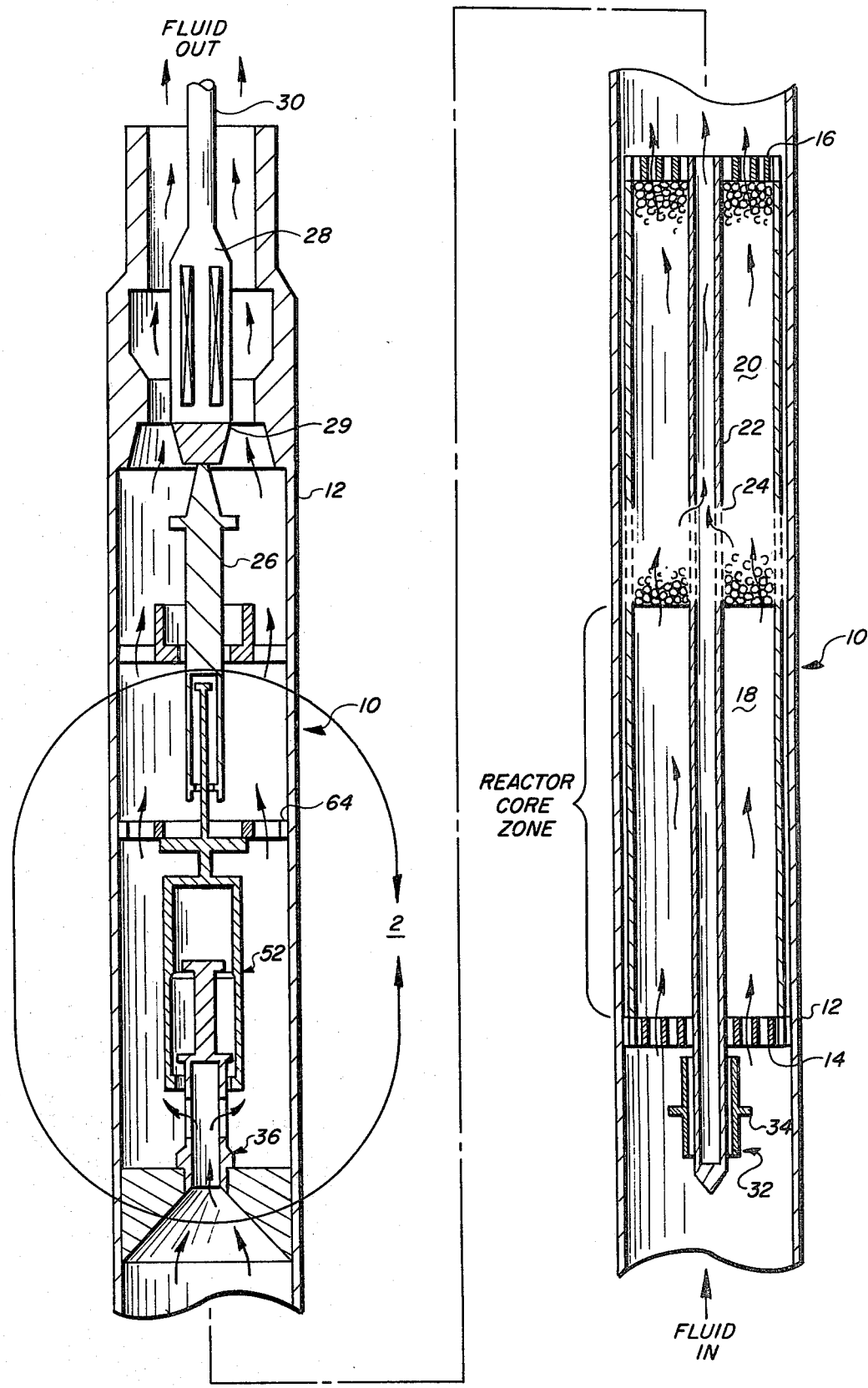
FIG. 1 is a diagrammatic sectional view of a typical absorber ball column for use in a nuclear reactor including the valve of the present invention.

Referring now to FIG. 1, therein is depicted a hydraulically supported neutron absorber element column designated generally as 10. The column depicted incorporates the valve of the present invention in a particularly preferred application, namely, in a nuclear reactor of the type which utilizes a plurality of hydraulically supported neutron absorbing elements. The column will have an outside configuration substantially the same as the fuel elements which are placed in the core of the nuclear reactor. The reactor core generally will comprise a plurality of fuel elements, absorber columns, and control rods, which also are made up of neutron absorbing material. Column 10 comprises a housing 12 containing therein lower and upper grates or aperture plates 14 and 16, respectively, which define a retention zone 18 which contains a body or stacked bed of neutron absorbing elements 20, which are depicted in their position during normal reactor operation. Specifically, as described more fully in U.S. Pat. No. 4,076,583, the stacked bed of neutron absorbing elements is supported by hydraulic fluid above and out of the reactor core zone. Also located in housing 10 and retention zone 18 is a fluid bypass tube 22 provided with a plurality of apertures or openings 24 to permit a portion of the fluid passing into the stacked bed of neutron absorbing elements 20 to bypass the bed thus ensuring that the elements are reliably maintained out of the core zone and minimizing the pressure drop through the stacked bed.

Located above the neutron absorbing elements is the valve of the present invention which is circled as detail 2 and which will be described with more particularity with reference to FIG. 2 which shows the valve in an enlarged view and in greater detail. The fluid passing through the valve, shown in its open normal operating position, passes upwardly through housing 12 and out the upper end thereof. Also included in housing 12 is a weighted number 26 for mechanically moving the valve of the present invention from an open to a closed position or vice versa. Weighted member 26 is retained in position by an electromagnet 28 and a curie point alloy magnet 29 which are affixed to an elongated rod 30, the two acting cooperatively together with rod 30 during normal operation to move weighted member 26 and open or close the valve of the present invention. In the event that the fluid passing therethrough exceeds a certain maximum desired temperature, such as in the event of a transient overpower, curie point alloy magnet 29 will automatically release weighted member 26 which will in turn close the valve of the present invention causing the neutron absorbing elements to rapidly drop into the reactor core shutting down the reactor. Alternatively, electromagnet 28 can be deenergized to release weighted member 26.

Located adjacent a lower end of bypass tube 22 and below aperture plate 14 there advantageously also is provided a self-lifting flow cutoff valve 32 provided with a drag plate 34. During normal operation, the fluid flowing past valve 32 acts upon drag plate 34 to lift the valve from an open position to a closed position whereby substantially all the fluid flows through aperture plate 12. In the event the fluid flow drops below a predetermined point, the valve drops back to an open position permitting fluid flow through apertures (not shown) in the lower end of bypass tube 22. This in turn permits fluid displaced by the descending column of neutron absorbing elements to flow in through the bypass tube and out through the bottom apertures (not shown) whereby neutron absorbing elements fall into the core zone more rapidly than they would without the addition of flow valve 32. The required area of the drag plate is, of course, a function of the desired actuation flow rate and weight of the valve. The area may be determined mathematically or through experimentation. In a preferred embodiment, the sealing arrangement in flow valve 32 is substantially an inverted image of the sealing means of the valve of the present invention which will be described more fully in the following paragraphs.

Figure 2:
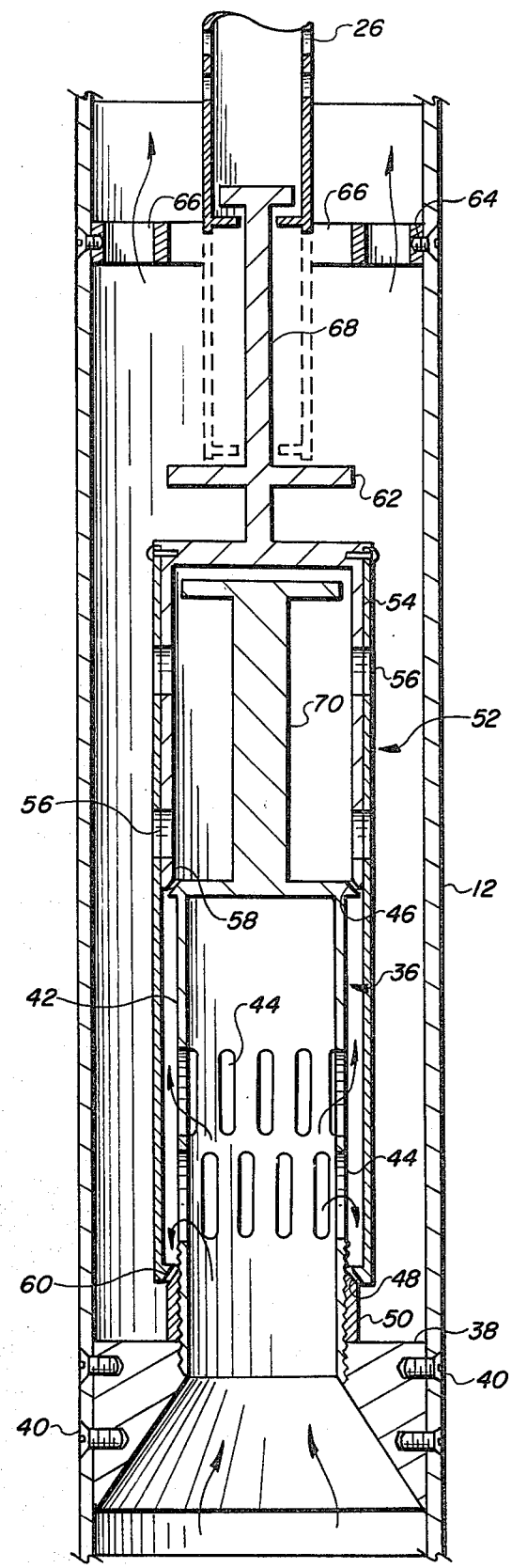
FIG. 2 is an enlarged detailed sectional view of the valve of the present invention shown in FIG. 1.

Referring now to FIG. 2, therein is depicted the valve of the present invention in an enlarged sectional view. For convenience in understanding the invention, in this view the valve is shown in a closed position, for example, as if having been moved to the closed position by weighted member 26 acting along the dotted lines. In the embodiment depicted, housing 12 forms a part of the valve of the present invention. Located within housing 12 is a substantially vertical elongated nozzle assembly 36 comprising an inlet member 38 affixed to the housing 12 by, for example, a plurality of threaded fasteners 40. Nozzle assembly 36 further includes a substantially vertical nozzle housing 42 provided with a plurality of apertures 44 adjacent its top end. Nozzle assembly 36 includes sealing means located above and below the apertures 44 such as the downwardly outwardly extending sealing surfaces 46 on nozzle housings 42 and 48 on adjustment ring 50, respectively, the latter of which is threadedly attached to nozzle housing 42 to provide for vertical adjustment.

Also located in housing 12 is flow cutoff sleeve assembly 52 having walls 54 surrounding nozzle housing 42. The upper portion of walls 54 are provided with at least one fluid flow opening 56. Flow cutoff sleeve assembly 52 further includes two sealing means 58 and 60, one located below the flow opening 56 and the other located adjacent the lower end of wall 54. The two sealing means comprise radially inwardly and upwardly extending surfaces. It will be seen from the drawing that in accordance with the present invention when the valve is in a closed position, sealing means 46 and 58 and sealing means 48 and 60 act cooperatively to provide for the exposure of a greater area for fluid pressure to exert force in a downward direction than is exposed for fluid pressure to exert force in an upward direction, whereby once the valve is in a closed position, an increase in fluid pressure will act to maintain said valve in a closed position. Cutoff sleeve assembly 52 also includes a balance member 62 which, when said sleeve is in the open position, contacts an apertured plate 64 having a plurality of apertures 66 to provide a flow area for the flow of fluid therethrough. When in contact, balance member 62 obstructs or covers a sufficient flow area such that when fluid is flowing through the housing there is provided a pressure drop across the balance member, said pressure drop being just sufficient to maintain the cutoff sleeve in an open position at a predetermined minimum flow rate. The flow area which should be obstructed by balance member 62 is readily determinable in accordance with the following equation:

$$A = \frac{Wa^2}{C_f Q^2}$$

where W is the weight of the sleeve assembly, a is the unobstructed flow area through the apertures, Q is desired minimum flow rate at which the valve should close and $C_f$ is the nozzle coefficient of the apertures. The nozzle coefficient will be a function of, among other things, the shape of the apertures and the thickness of the plate. Its value is readily determinable by one skilled in the art through routine experimentation.

Advantageously, the valve of the present invention further includes some mechanical means for moving the flow cutoff sleeve between an open and closed position. An exemplary type of mechanical means illustrated in FIG. 2 is depicted as link member 68, which is slidingly connected to weighted member 26 to provide mechanical movement between an open and closed position. The weighted member has sufficient weight to overcome the retention force provided by the pressure drop across balance member 62.

In a preferred embodiment of the invention, there also is provided a piston member 70 which is located above and attached to nozzle housing 42. In operation as flow cutoff sleeve assembly 52 moves from an upward open position to a downward closed position, the fluid contained therein is readily displaced out through flow openings 56 until such time as the uppermost surface of piston member 70 is past the uppermost opening, at which time the flow area for displaced fluid is reduced to a desired minimum value determined by the clearance between piston member 70 and inside diameter of sleeve walls 54 of flow cutoff assembly 52.

A valve in accordance with the present invention was constructed and installed in a test neutron absorber column subassembly, substantially as depicted in FIGS. 1 and 2. The invention was tested by reducing the flow of fluid through the subassembly at various rates and measuring the time required for substantially all of the neutron absorbing elements to drop into the core zone, both with and without the valve of the present invention. It was determined that the time for all of the elements to fall into the core zone was substantially constant (from about 4 to 6 seconds) using the valve of the present invention. Without the valve, the time varied considerably depending upon the rate at which flow was reduced. Indeed, in some instances, where the flow was slowly reduced to zero, the time required for all of the elements to drop into the core zone was as long as 20 seconds or more. Thus, this example clearly demonstrates the utility of the present invention. In addition, it is difficult to design a neutron absorber column subassembly in such a manner that the elements will consistently drop into the core zone until the flow is reduced below about 50% of the design operating flow rate. With the present invention, it is readily possible to design the balance member such that the valve will close at any desired minimum flow rate. Further, the closing point is highly repeatable, thus further demonstrating that the present invention provides a reliable self-actuating valve.

While the invention has been described with reference to a particular preferred embodiment, it will be readily apparent that it would have utility in other areas wherein a self-actuating, self-locking valve is desired. In addition, in some instances it may be desirable to provide some resilient material on the sealing surfaces to ensure substantially zero leakage around those surfaces. However, in the particularly preferred embodiment, some leakage is not only acceptable but actually is desired. Specifically, when the invention is used in conjunction with a reactor, there may be a considerable amount of decay heat by the absorber elements and it is desirable to maintain some fluid flow through the column even though the valve is in a closed position. In such instance it is readily feasible to design the sealing surfaces such that there is a desired amount of leakage therethrough. Numerous other advantages and variations of the invention will be readily apparent to those skilled in the art. Accordingly, the scope of the invention should be determined not by the illustrative embodiments depicted, but rather by the appended claims.

What is claimed is:

1. A self-actuating, self-locking flow cutoff valve particularly adapted for use in a nuclear reactor of the type which utilizes a plurality of fluid supported neutron absorber elements to provide for the safe shutdown of the reactor, said flow cutoff valve comprising:
   a substantially vertical elongated housing having opposite ends for the flow of said fluid therethrough;
   an apertured plate located in said housing, the apertures providing for fluid flow from one end of said housing to the other end;
   a substantially vertical elongated nozzle member having top and bottom ends located in said housing, and fixed to said housing, an opening in the bottom end of said nozzle member for receiving said fluid and apertures adjacent the top end for discharging said fluid, and two sealing means comprising radially outwardly and downwardly extending sealing surfaces, one located above and the other below said apertures;
   an elongated flow cutoff sleeve located in said housing and having walls surrounding said nozzle, a fluid flow opening adjacent an upper end of said sleeve, two sealing means comprising radially inwardly and upwardly extending sealing surfaces affixed to said sleeve, one below said flow opening and one adjacent a lower end of said sleeve, said sleeve being movable between an upper open position wherein said apertures in said nozzle member are substantially unobstructed for the flow of fluid therethrough, and a closed position wherein said sleeve and said nozzle sealing surfaces are mated, the mated sealing surfaces and the walls of said sleeve obstruct the flow of said fluid through said apertures, said nozzle and sleeve sealing means cooperatively acting together to further provide for the exposure of a greater area for fluid pressure to exert a force in a downward direction than is exposed for fluid pressure to exert force in an upward direction whereby once said valve is in a closed position an increase in fluid pressure will act to maintain said valve in a closed position; and
   a balance member located above and attached to said flow cutoff sleeve, said balance member contacting said apertured plate when said sleeve is in an open position and obstructing the flow of fluid through a predetermined flow area of the apertures in said apertured plate for producing a pressure drop across the apertured plate and said balance member, said pressure drop being just sufficient to support said balance member and flow cutoff sleeve at a predetermined minimum fluid flow whereby, when said fluid flow drops below the predetermined flow, the pressure drop across said balance member will be insufficient to maintain said flow cutoff sleeve in the open position and it will move under the influence of gravity to a closed position.

2. The flow cutoff valve of claim 1 further comprising a piston member extending upwardly from the top end of the nozzle member into said flow cutoff sleeve a sufficient distance such that when said sleeve moves from an open to a closed position, the uppermost portion of said piston member moves past said flow opening in said flow cutoff sleeve and provides a dampening force on the closure of said flow cutoff sleeve.

3. The flow cutoff valve of claim 1 further comprising means for moving said flow cutoff sleeve between an open and closed position.

4. In a nuclear reactor of the type which includes a plurality of laterally displaced vertical neutron absorber column assemblies located in and extending out of the reactor core, each of the column assemblies containing a plurality of neutron absorbing elements which, during normal operation of the reactor, are hydraulically supported outside of the core of the reactor, the improvement comprising:
   a self-actuating, self-locking flow cutoff valve, said valve including:
   a substantially vertical elongated housing having opposite ends for the flow of said fluid therethrough;
   an apertured plate located in said housing, the apertures providing fluid flow from one end of said housing to the other end;
   a substantially vertical elongated nozzle member having top and bottom ends located in said housing and fixed to said housing, an opening in the bottom end of said nozzle member for receiving said fluid, apertures adjacent the top end for discharging said fluid, and two sealing means comprising radially outwardly and downwardly extending sealing surfaces, one located above and the other below said apertures;
   an elongated flow cutoff sleeve located in said housing having walls surrounding said nozzle, a fluid flow opening adjacent an upper end of said sleeve, two sealing means comprising radially inwardly and upwardly extending sealing surfaces affixed to said sleeve, one below said flow opening and one adjacent a lower end of said sleeve, said sleeve being moveable between an upper open position wherein the apertures in said nozzle member are substantially unobstructed for the flow of fluid therethrough and a closed position wherein said sleeve and nozzle sealing surfaces are mated, the mated sealing surfaces and the wall of said sleeve obstruct the flow of said fluid through said apertures, and said nozzle and sleeve sealing means cooperatively acting together to further provide for the exposure of a greater area for fluid pressure to exert force in a downward direction than is exposed for fluid pressure to exert force in an upward direction whereby once said valve is in a closed position, an increase in fluid pressure will act to maintain said valve in a closed position; and a balance member located above and attached to said flow cutoff sleeve, said balance member contacting said apertured plate when said sleeve is in an open position and obstructing the flow of fluid through a predetermined flow area of the apertures in said apertured plate for producing a pressure drop across the apertured plate and said balance member, said pressure drop being just sufficient to support said balance member and flow cutoff sleeve at a predetermined minimum fluid flow whereby, when said fluid flow drops below the predetermined flow, the pressure drop across the balance member will be insufficient to maintain said flow cutoff sleeve in the open position and it will move under the influence of gravity to a closed position.

5. The flow cutoff valve of claim 4 further including a piston member extending upwardly from the top end of the nozzle member into said flow cutoff sleeve a sufficient distance such that when said sleeve moves from an open to a closed position, the uppermost portion of said piston member moves past said flow opening in said flow cutoff sleeve and provides a dampening force on the closure of said flow cutoff sleeve.

6. The flow cutoff valve of claim 5 further including means for moving said flow cutoff sleeve between an open and closed position.

7. The flow cutoff valve of claim 6 wherein said means comprises an elongated rod releasably attached to a weighted member, having sufficient weight to move said flow cutoff sleeve to a closed position.

8. The flow cutoff valve of claim 7 wherein said rod is releasably connected to said weighted member by at least one magnet.

9. The flow cutoff valve of claim 8 wherein said magnet comprises a curie point alloy.

10. The flow cutoff valve of claim 8 wherein said rod is releasably connected to said weighted member by two magnets, one of said magnets comprising a curie point alloy magnet and the other comprising an electromagnet.

* * * * *